(12) United States Patent
Metzinger

(10) Patent No.: US 10,683,849 B2
(45) Date of Patent: Jun. 16, 2020

(54) DEFLECTOR PLATES, KITS AND METHODS

(71) Applicant: AIP A/S, Hillerød (DK)

(72) Inventor: Luke Metzinger, West Allis, WI (US)

(73) Assignee: Alimak Group AB, Stockholm (SE)

(*) Notice: Subject to any disclaimer, the term of this patent is extended or adjusted under 35 U.S.C. 154(b) by 0 days.

(21) Appl. No.: 15/789,763

(22) Filed: Oct. 20, 2017

(65) Prior Publication Data
US 2018/0112650 A1    Apr. 26, 2018

Related U.S. Application Data

(60) Provisional application No. 62/411,559, filed on Oct. 22, 2016.

(51) Int. Cl.
| | | |
|---|---|---|
| *F03D 80/80* | (2016.01) | |
| *F03D 80/00* | (2016.01) | |
| *F03D 80/50* | (2016.01) | |
| *F03D 13/20* | (2016.01) | |
| *E04F 13/08* | (2006.01) | |
| *E04H 12/00* | (2006.01) | |

(52) U.S. Cl.
CPC .......... *F03D 80/88* (2016.05); *E04F 13/0883* (2013.01); *E04H 12/00* (2013.01); *F03D 13/20* (2016.05); *F03D 80/00* (2016.05); *F03D 80/50* (2016.05); *F05B 2230/60* (2013.01); *F05B 2240/912* (2013.01); *F05B 2260/30* (2013.01); *Y02E 10/728* (2013.01); *Y02P 70/523* (2015.11)

(58) Field of Classification Search
CPC ..... E04G 21/32; E04G 21/3285; E04G 21/24; E04G 21/328; F03D 80/50; F03D 80/88; F03D 80/00; F05B 2260/30; F05B 2240/912
See application file for complete search history.

(56) References Cited

U.S. PATENT DOCUMENTS

| | | | | |
|---|---|---|---|---|
| 8,899,539 B2 * | 12/2014 | Oliver | ..................... | B23P 11/00 248/229.1 |
| 9,138,836 B2 * | 9/2015 | Oliver | ..................... | B23P 11/00 |
| 9,822,537 B2 * | 11/2017 | Garcia | .................... | E04G 21/32 |
| 2010/0126115 A1 * | 5/2010 | Lim | ....................... | E04H 12/085 52/848 |
| 2010/0307097 A1 * | 12/2010 | Word, III | .............. | E04H 12/085 52/651.07 |

(Continued)

FOREIGN PATENT DOCUMENTS

| CN | 204827812 U | * | 12/2015 |
|---|---|---|---|
| CN | 204827812 U | | 12/2015 |

OTHER PUBLICATIONS

Counterpart EP Appln. No. 17196497.6 (published as EP 3312419 A1 and counterpart to U.S. Appl. No. 15/123,636), International Search Report and Written Opinion, dated Mar. 20, 2018.

(Continued)

*Primary Examiner* — Jessie T Fonseca
(74) *Attorney, Agent, or Firm* — Cheryl H. Agris; Agris & von Natzmer, LLP

(57) ABSTRACT

Provided are deflector plates configured to avoid collisions with an interior component of a tower section for personnel ascending or descending the tower section, kits including such deflector plates and methods for mounting said deflector plates in a tower section.

15 Claims, 9 Drawing Sheets

(56) References Cited

U.S. PATENT DOCUMENTS

| | | | |
|---|---|---|---|
| 2011/0214388 A1* | 9/2011 | London | E04G 21/32 52/745.21 |
| 2012/0000341 A1 | 1/2012 | Oliver | |
| 2012/0003418 A1* | 1/2012 | Oliver | B23P 11/00 428/99 |
| 2014/0123568 A1* | 5/2014 | Nurdogan | E04D 1/30 52/57 |
| 2015/0052734 A1* | 2/2015 | Oliver | B23P 11/00 29/525.08 |

OTHER PUBLICATIONS

Counterpart EP Appln. No. 17196497.6 (published as EP 3312419 A1 and counterpart to U.S. Appl. No. 15/123,636), response to written opinion and amended claims and specification dated Oct. 22, 2018.

\* cited by examiner

DEFLECTOR PLATES, KITS AND METHODS

FIELD

The present disclosure relates to deflector plates configured to avoid collisions between an interior component of a tower and personnel ascending or descending within the tower. The present disclosure further relates to kits including such deflector plates and methods for mounting deflector plates.

BACKGROUND

Modern wind turbines are commonly used to supply electricity into the electrical grid. Wind turbines generally comprise a rotor with a rotor hub and a plurality of blades. The rotor is set into rotation under the influence of the wind on the blades. The rotation of the rotor shaft drives the generator rotor either directly ("directly driven") or through the use of a gearbox. The gearbox (if present), the generator and other systems are usually mounted in a nacelle on top of a wind turbine tower. In order to extract a larger amount of energy from the wind, the blades are ever increasing in size and the towers are made taller to enable the rotor to capture more wind at higher altitudes.

Wind turbine towers both for onshore and offshore applications are usually formed by a number of tubular tower sections, which are fastened together at flanges by a series of bolts.

The tower sections are adapted to house a number of operating components of the wind turbine. Examples of wind turbine operating components that may be housed inside a wind turbine tower are electrical power modules, transformers, frequency converters, switch cabinets, inverters, control units, power cables, ladders, platforms, service lifts, etc.

The designs of wind turbine towers vary considerably, depending on each make and model. The following, however, are typical operating components:
- A fixed ladder provided in the tower sections to afford the maintenance personnel a means to ascend and descend the tower to perform job tasks;
- A certified fall arrest system installed throughout the length of the ladder to provide continuous fall protection.

Wind turbines typically have computer control (SCADA) systems and are operated remotely. If a wind turbine faults, it may be reset remotely. If it cannot be remotely reset, maintenance personnel may need to enter the turbine to troubleshoot the fault and correct it. This may involve corrective maintenance and a turbine ascent/descent by the maintenance personnel using the fixed ladders.

Many companies in the wind industry have also installed climb assists on some wind turbines to reduce the physical exertion required to ascend and descend ladders.

Climb assist systems are typically systems that will assist maintenance personnel during the climb. Maintenance personnel will be coupled to their fall protection system while also using the climb assist system. The maintenance personnel's harness may be connected to a cable or rope that goes to the top of the ladder, over a pulley and back down in a continuous loop.

The system pulls the employee upward reducing the weight supported by the body during the climb. This type of climb assist system will typically have a continuous cable that is driven by a motor.

One of the several problems associated with the use of ladders is that the clearance space within the wind turbine towers is narrow, thus creating a potential hazard for personnel ascending and descending inside the tower. Particularly, some of the bolts, or tower flanges or other components protruding into the clearance space within the wind turbine towers could cause bodily harm for maintenance personnel going up and down a ladder.

Use of climb assistance increases the speed at which climbers move up and down the turbine ladder. This means that users approach flanges at a faster rate.

Examples of the present disclosure seek to at least partially reduce one or more of the aforementioned problems. Even though the present disclosure is aimed at wind turbine towers, similar problems may exist in other towers, in particular towers, wherein tower sections are mounted on top of each other and attached to each other at flanges.

SUMMARY

In a first aspect, a deflector plate configured to avoid collisions with an interior component of a tower portion for personnel ascending or descending the tower portion is provided. The tower portion comprises one or more tower sections. The deflector plate extends from a first mounting surface to a second mounting surface. The first mounting surface and second mounting surface comprise one or more magnets for attachment to an inner surface of one of the tower sections. The deflector plate furthermore comprises a hole configured to receive an anchoring element for securing the deflector plate to the tower portion.

According to this first aspect, a deflector plate that is configured to provide the function of protecting personnel ascending or descending a tower section as they approach interior components of the tower section e.g. flanges is provided. To this end, the deflector plate is provided extending from a first mounting surface to a second mounting surface. Moreover, the first mounting surface is attached in use to the inner surface of the tower section. With such an arrangement, interior components protruding into the personnel safety space of the tower section are at least partially covered up by the deflector plate, thus the risk of accidents while ascending or descending the tower section e.g. hitting interior components may be avoided.

Moreover, the first mounting surface in use is magnetically attached to the interior part of the component, thus preventing structure-weakening attachments e.g. bolted or welded attachments.

Additionally, the attachment of the deflector plate to the tower is improved. The deflector plate as proposed herein may be further secured to a tower section using an anchoring element. The deflector plate may thus properly remain in place instead of falling off or being displaced in case of e.g. maintenance personnel hitting the deflector plate by accident while ascending/descending the tower section.

Throughout the present disclosure, a tower portion is to be regarded as a portion of a tower. The tower portion may include a single tower section, or multiple tower sections.

A tower section is to be regarded as a cylindrical or frustoconical section covering 360° of a circle. A tower is formed by a plurality of tower sections mounted on top of each other, and generally attached to each other at flanges. A tower section may be made up from a number of segments, each segment covering e.g. 90° or 120° of a circle.

In a further aspect, a kit is provided. The kit includes a deflector plate according to the first aspect. The kit further includes an anchoring element for mechanically securing the deflector plate to the tower section. The anchoring element may in particular be a wire. Such a wire may be inserted through the hole of the deflector plate and form a loop catching the deflector plate.

In some examples, the kit may further comprise a snap ring. A kit comprising all or various of the elements needed in procedures for mounting a deflector plate in a wind turbine section can thus be provided.

In yet another aspect, a method for mounting a deflector plate in a tower section is provided. The first mounting surface of the deflector plate is brought in proximity of an inner surface of the tower section. The deflector plate is pushed towards the inner surface of the tower section such that the first mounting surface is magnetically coupled to the inner surface of the tower section. An anchoring element then engages with the hole of the deflector plate and mechanically securing the deflector plate to the tower section.

Definitions

Where a range of values are provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described.

All publications and patents cited in this disclosure are incorporated by reference in their entirety. Nothing herein is to be construed as an admission that the invention is not entitled to antedate such disclosure by virtue of prior invention. To the extent the material incorporated by reference contradicts or is inconsistent with this specification, the specification will supersede any such material.

It must be noted that as used herein and in the appended claims, the singular forms "a," "and" and "the" include plural references unless the context clearly dictates otherwise.

Unless otherwise indicated, the term "at least" preceding a series of elements is to be understood to refer to every element in the series. Those skilled in the art will recognize, or be able to ascertain using no more than routine experimentation, many equivalents to the specific embodiments of the invention described herein. Such equivalents are intended to be encompassed by the present invention. Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integer or step. Thus the terms "comprising", "including," "containing", "having" etc. shall be read expansively or open-ended and without limitation. When used herein, the term "comprising" can be substituted with the term "containing" or sometimes when used herein with the term "having".

BRIEF DESCRIPTION OF THE DRAWINGS

Non-limiting examples of the present disclosure will be described in the following, with reference to the appended drawings, in which.

DETAILED DESCRIPTION OF EXAMPLES

Figure 1:
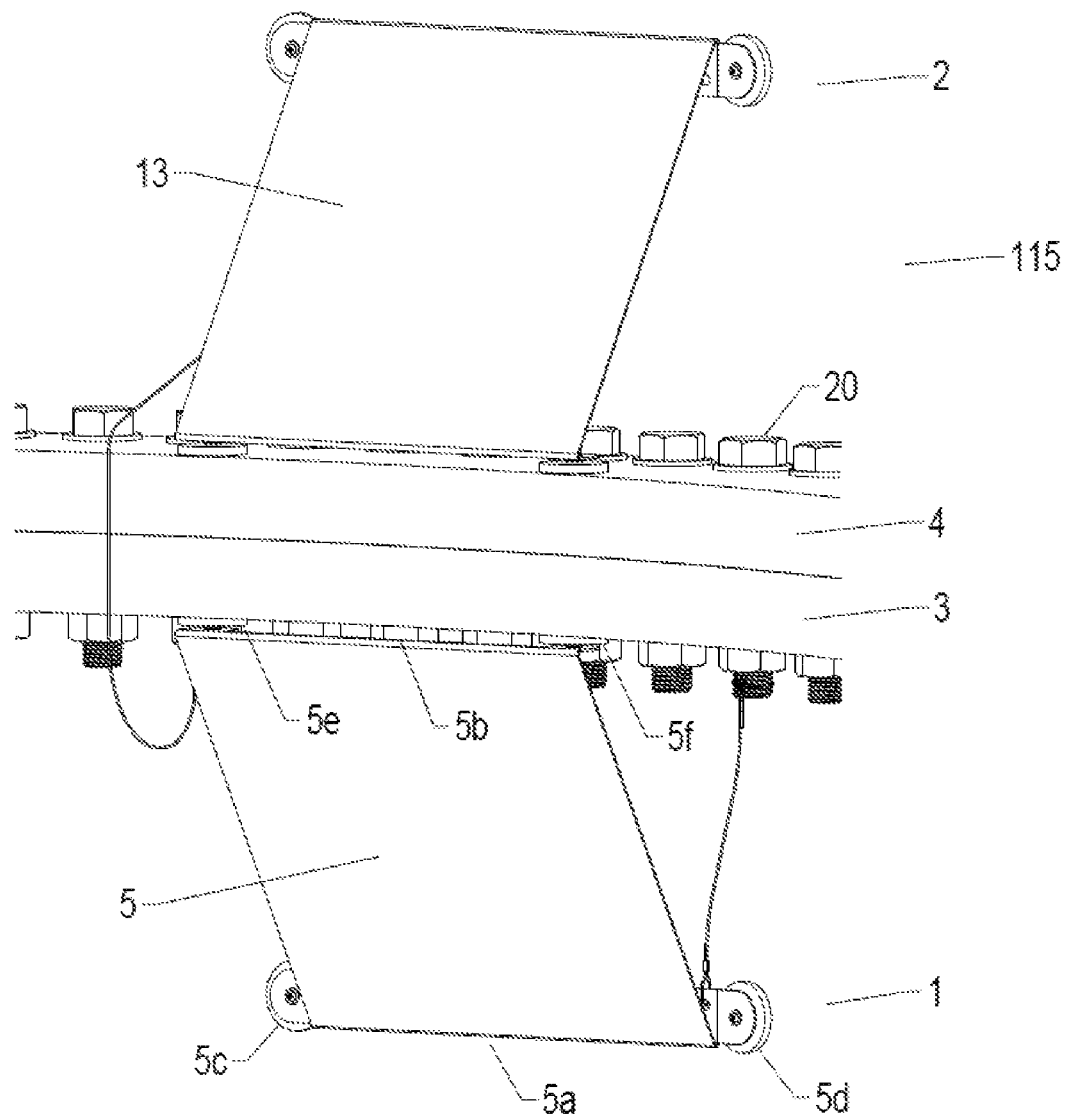
FIG. 1 schematically illustrates an example of a tower comprising a first tower section with a first deflector plate and a second tower section with a second deflector plate.

FIG. 1 illustrates a view of a tower comprising a first tower section with a first deflector plate and a second tower section with a second deflector plate according to an example of the present invention. The tower shown may be a wind turbine tower.

The tower 115 in this example is conical i.e. the diameter increases towards the base. The tower 115 may comprise a first frustoconical tower section 1 and a second frustoconical tower section 2 (and optionally further frustoconical or cylindrical tower section).

The first tower section 1 comprises an upper flange 3 and a lower flange (not shown). The second tower section 2 also comprises an upper flange (not shown) and a lower flange 4. The upper flange 3 of the first tower section 1 is joined to the lower flange 4 of the second tower section 2 using bolts 20 or studs. The bolts 20 can be tightened with suitable nuts (not shown), thus fixing the first tower section 1 to the second tower section 2. Evidently, the other tower sections forming the tower may be attached in the same way.

In the example of FIG. 1, the first tower section 1 comprises a first substantially straight (and flat) deflector plate 5. In this particular example, the deflector plate 5 has the shape of a flat square. However, other suitable shapes are possible e.g. rectangular. The deflector plate 5 extends from a first mounting surface 5a to a second mounting surface 5b. The function of the deflector plates is a smoothing of a possible collision of e.g. maintenance personnel with the tower flanges or bolts.

The mounting surface 5a of the deflector plate 5 may be provided with a first magnet 5c located at a first corner of the mounting surface 5a. Additionally, a second magnet 5d may be provided at a corner opposite to the first corner of the first mounting surface 5a.

Similarly, third magnet 5e and fourth magnet 5f are provided at the second mounting surface 5b. In this example, the first and second mounting surfaces are formed by flanges. The flanges may form sharp angles with the deflector plate 5. In some examples, the magnets may be attached to the flanges using e.g. screws or bolts.

The magnets 5c-5d are provided such that in use the first mounting surface 5a (and thus the deflector plate 5) is magnetically attached to a curved inner surface of the steel cylindrical tower section of the first tower section 1. With respect to the magnets 5e-5f, these magnets may be magnetically attracted by the upper flange 3 of the first tower section 1.

In some examples, each magnet may be encapsulated in a barrier material. The barrier material may protect the magnet from humidity and dust, thus preventing corrosion.

With an arrangement substantially as hereinbefore described, at least part of the upper flange 3 may be shielded by the deflector plate 5, thus the risk of e.g. maintenance personnel hitting the upper flange 3 while ascending the first tower section 1 is avoided.

In some examples, the deflector 5 may be painted yellow to further act as a visual warning of approaching flange to the maintenance personnel travelling up the tower section using e.g. a ladder.

Similarly, a second deflector plate 13 may be provided at the second tower section 2. The structure and operation of the deflector plate 13 may be same as described for the first deflector plate 5.

In alternative examples more or less deflector plates may be provided in the inner part of the tower 115 depending on e.g. the number of tower sections forming the tower or the number of components protruding into the clearance space within the tower section.

Figure 2:
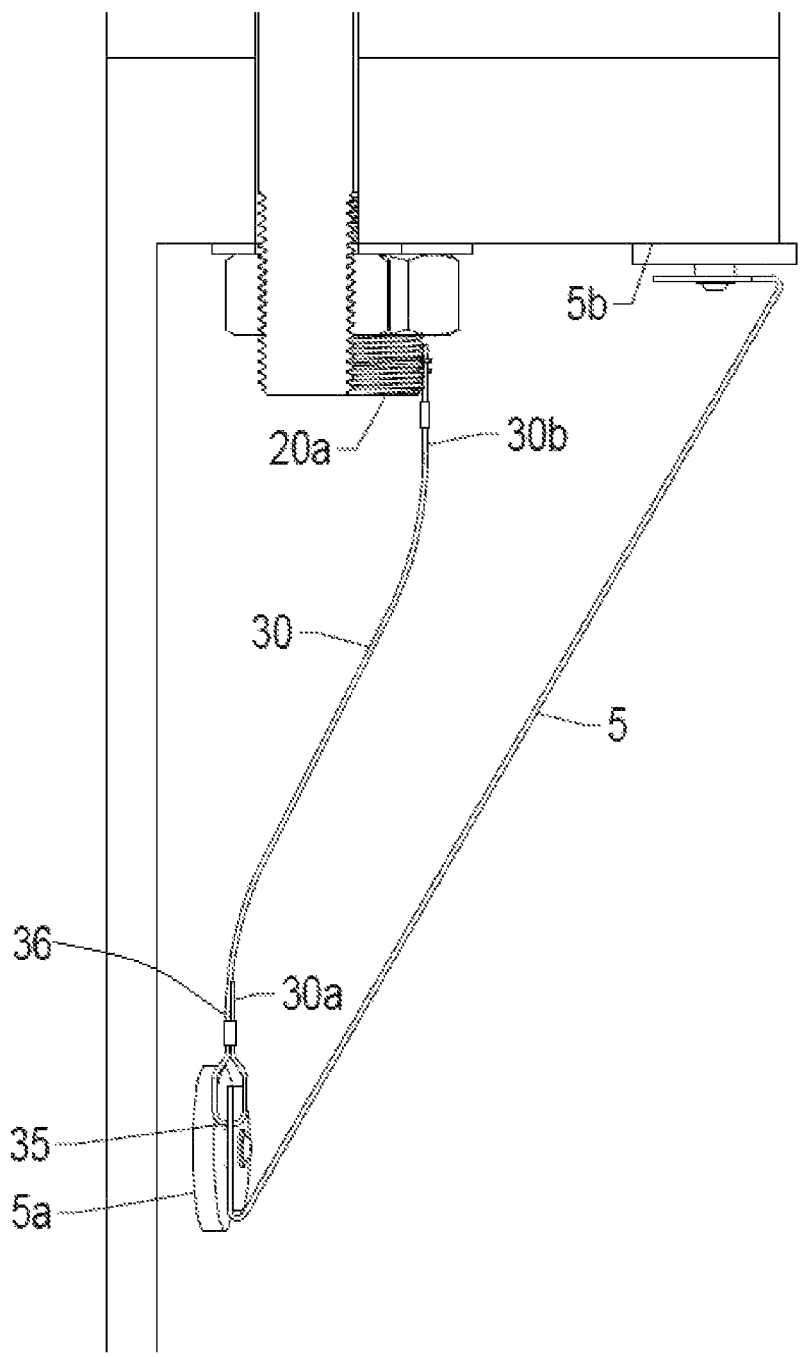
FIG. 2 schematically illustrates a cross-section of the deflector plate shown in FIG. 1.

FIG. 2 schematically illustrates a cross-section of the deflector plate 5 shown in FIG. 1. In this figure, the same reference numbers denote the same elements as those in the FIG. 1. The attachment of the second mounting surface 5b to the upper flange and the first mounting surface 5a to the inner surface of the tower section may be performed in substantially the same way as described in FIG. 1.

The deflector plate 5 may be provided with a through hole 35. In this particular example, the hole 35 may be provided at the first mounting surface 5a. However, other suitable locations e.g. near the first mounting surface 5a of the hole along the deflector plate are possible.

In some examples, the hole 35 may be specifically shaped to provide a proper insertion of a first end 30a of an anchoring element 30 e.g. a wire. Particularly, the first end 30a of the wire in question can be inserted through the hole and can be advanced. Once the first end 30a is advanced through the hole 35, the first end 30a can be coupled to a first intermediate portion 36 along the length of the wire. A loop may thus be formed catching a portion of the deflector plate.

Moreover, a second end 30b of the anchoring element 30 may be attached to a bolt 20a connecting the flanges of the tower sections. An example of a connection of the anchoring element (wire) 30 to the deflector plate 5 and the bolt 20a will be explained in more detail with reference to FIGS. 5a-5i.

With such an arrangement, the magnetic forces established by the magnets located at the mounting surfaces 5a, 5b of the plate are supplemented by a mechanical fixation of the deflector plate 5 to the bolt 20a using the anchoring element 30, thus further securing the deflector plate 5 to the bolt 20a (and thus to the first tower section 1). This way, it can be ensured that the deflector plate does not fall down the tower if it is hit by maintenance personnel or if the magnetic attachment is lost for some other reason.

Figure 3:
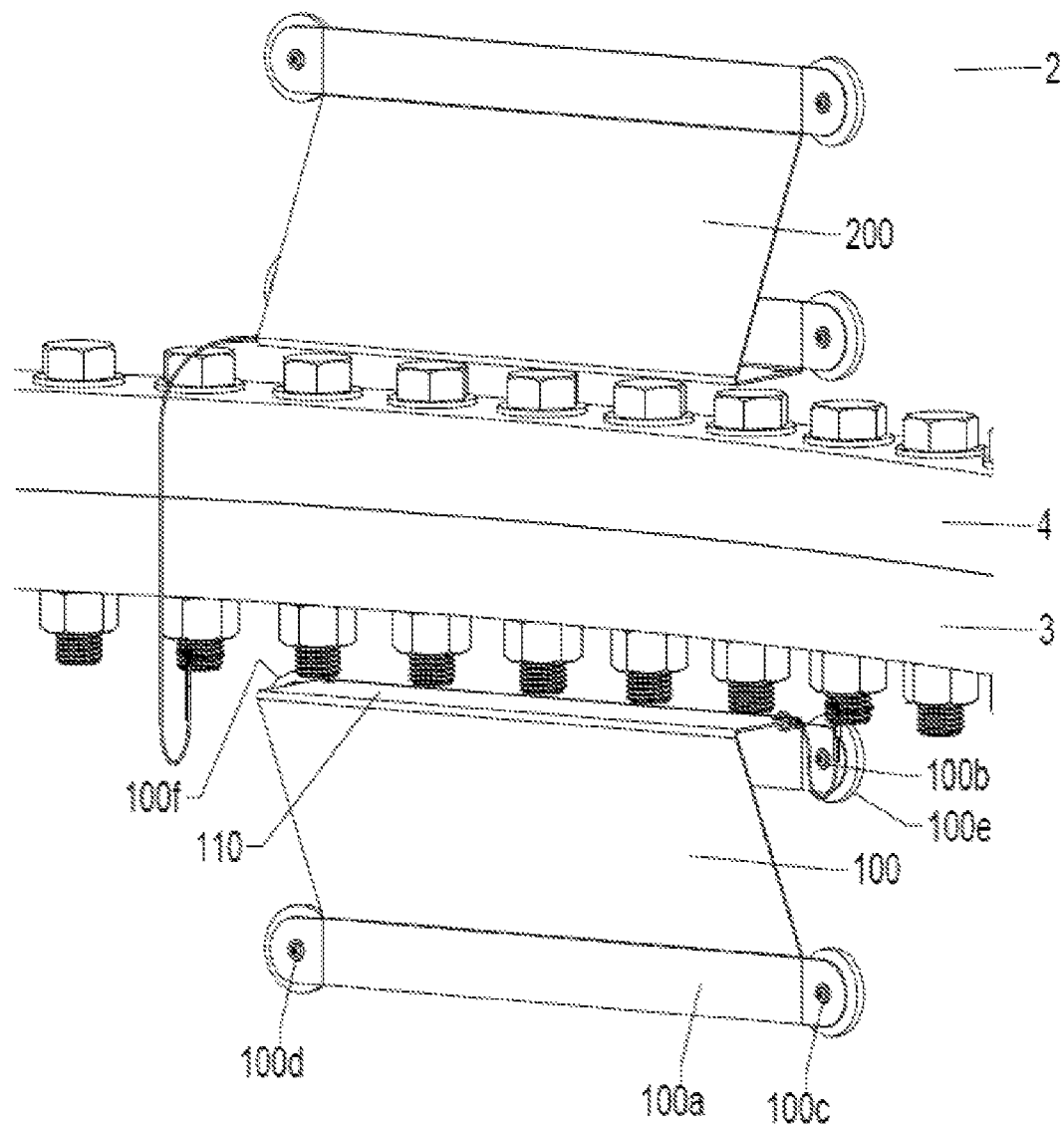
FIG. 3 schematically illustrates another example of a (wind turbine) tower comprising a first tower section with a first deflector plate and a second tower section with a second deflector plate.

FIG. 3 schematically illustrates a wind turbine tower comprising a first tower section with a first deflector plate and a second tower section with a second deflector plate according to another example of the present invention. A deflector plate 100 may be provided. Also here the deflector plate may extend from a first mounting surface 100a to a second mounting surface 100b. Similarly as in the first deflector plate shown in FIG. 1, the first mounting surface 100a may be magnetically attached to a cylindrical inner surface of the tower section using magnets 100c, 100d. The structure (and operation) of this first mounting surface may be the same as the one described for the first mounting of the deflector plate explained in FIG. 1.

Also here, the second mounting surface 100b of the deflector plate 100 may be provided with magnets 100e, 100f located at opposite sides of the second mounting surface 100b as in the deflector shown in FIG. 1.

In this particular example, the magnets 100e-100f (and thus the second mounting surface 100b) in use may be mounted to a cylindrical inner surface of a tower section (rather than to a tower flange).

Moreover, in this example, the deflector plate 100 comprises a first plate section and second plate section separated by a folding line 110. The plate sections define a sharp angle in between them. In this case, the deflector plate may have a substantially triangular shape.

Again, as in the example of FIG. 1, the deflector 100 may be painted yellow to act as a visual warning. Additionally, a deflector 200 may be provided magnetically attached to the inner surface of the second conical tower section 2. In the example shown, the deflector plate 200 magnetically mounted to the upper tower section 2 is mechanically secured to a bolt at a point below the flanges 3, 4. This is of course merely an example.

With an arrangement substantially as hereinbefore described, the flanges 3, 4 may be at least partially shielded by the deflector plates 100, 200 respectively. Thus, the risk of maintenance personnel hitting the upper flange 3 or the lower flange 4 while ascending/descending a ladder inside the tower is reduced.

Figure 4:
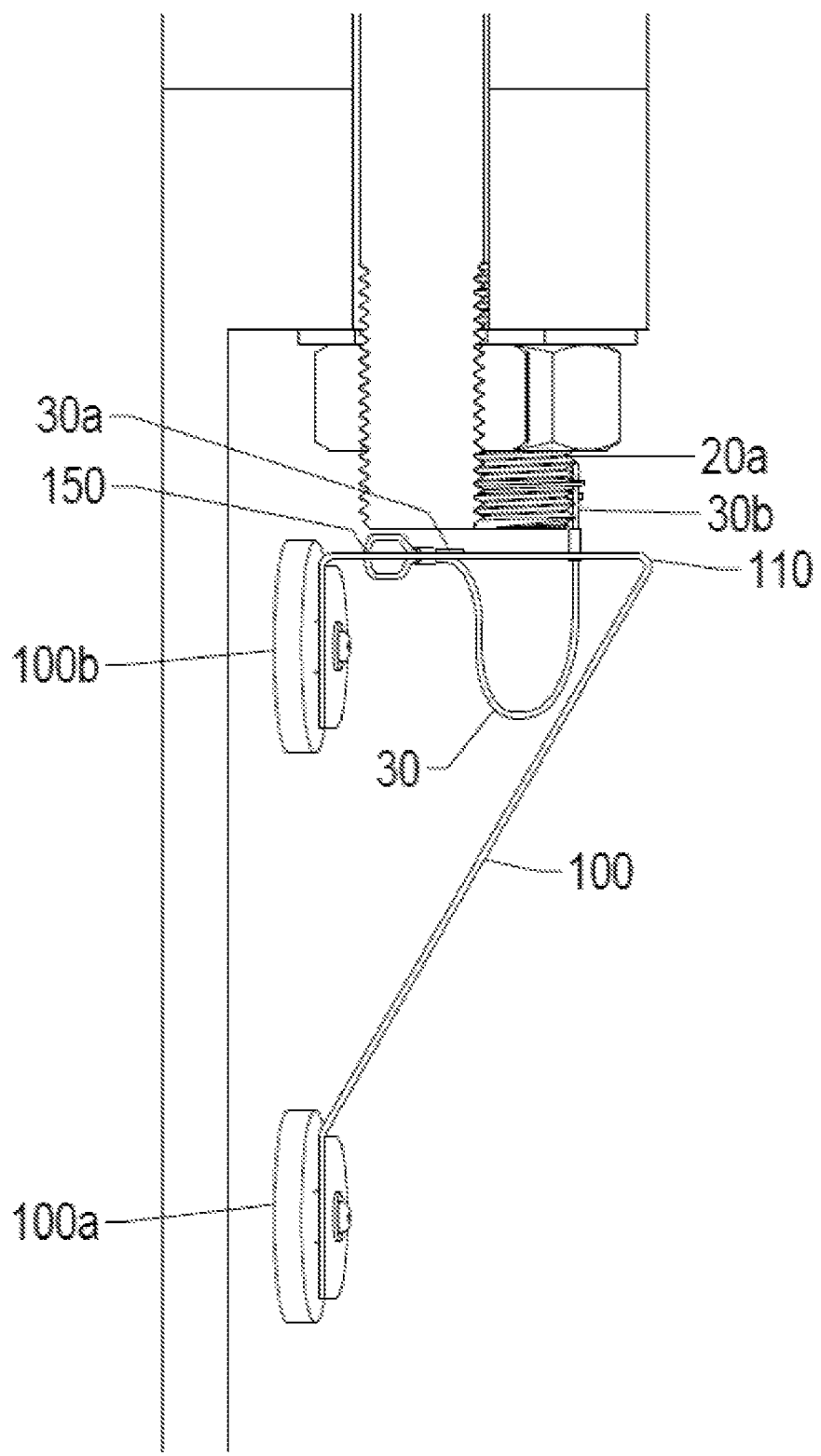
FIG. 4 schematically illustrates a cross-section of the deflector plate shown in FIG. 3.

FIG. 4 schematically illustrates a cross-section of the deflector plate 100 shown in FIG. 3. In this figure, the same reference numbers denote the same elements as those in the FIG. 3. Similarly as the deflector shown in FIG. 2, the deflector plate 100 may be provided with a hole 150 for receiving a first end 30a of a wire. A second end 30b of the wire 30 may be attached to a bolt 20a.

The connection of the wire 30 to the deflector plate 100 and the bolt 20 will be explained with more detail in FIGS. 5a-5i. FIGS. 5a-5i schematically illustrate a sequence of stages during an example of a method for mounting a deflector plate in a tower section.

Figure 5A:
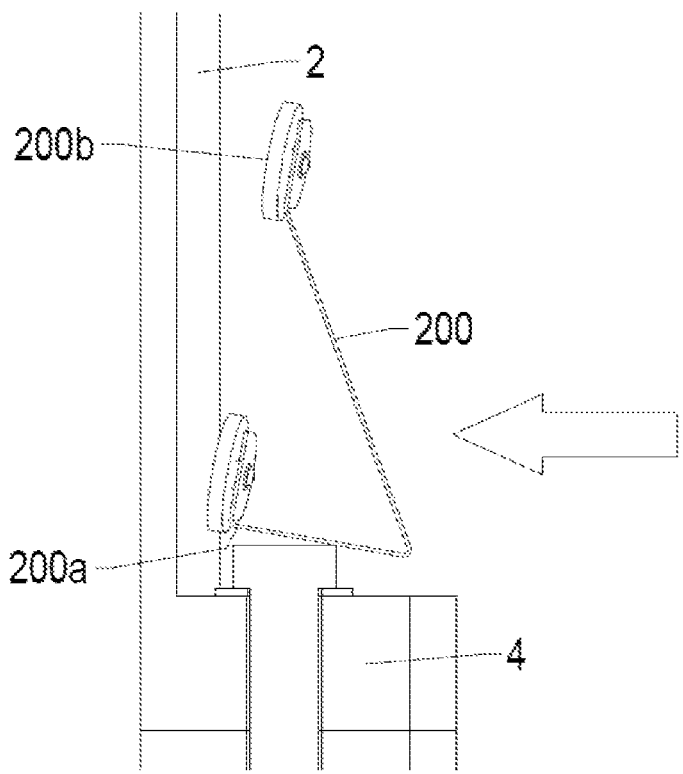
FIGS. 5a-5i schematically illustrate a sequence of situations that may occur during the performance of method for mounting a deflector plate in a tower section.

FIG. 5a, an example of a deflector plate 200 similar to the one described in examples of FIGS. 3-4 is shown. The structure of the deflector plate 200 may be the same as described in these figures.

The FIG. 5a illustrates an initial situation. A first mounting surface 200a of a deflector plate 200 may be seen that is arranged near an inner surface of the tower section 2. This way, the first mounting surface 200a is ready to be magnetically coupled to the inner surface of a cylindrical (or part-cylindrical) tower s.

Figure 5B:
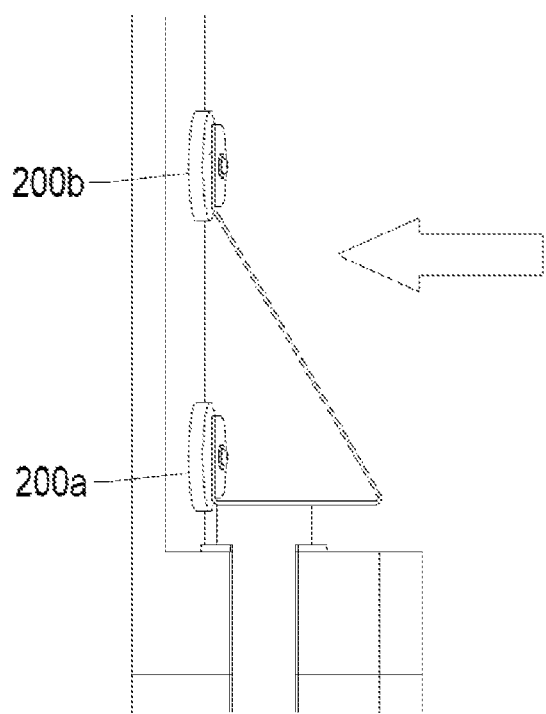

In FIG. 5b, the deflector plate 200 may be pushed (and thus moved) towards the inner surface of the tower section in the direction of the arrow. Thus, the first projection 200a may be magnetically coupled to the inner surface of the wind turbine component. At the same time, due to the force exerted to the deflector plate in the direction of the arrow, a second mounting surface 200b of the deflector plate 200 may be arranged near the inner surface of the tower section and, subsequently, the second mounting surface 200b may also be magnetically coupled to the inner surface of the wind turbine component. Thus, a magnetic fixation of the deflector plate to the inner surface of the wind turbine component has been achieved.

Figure 5C:
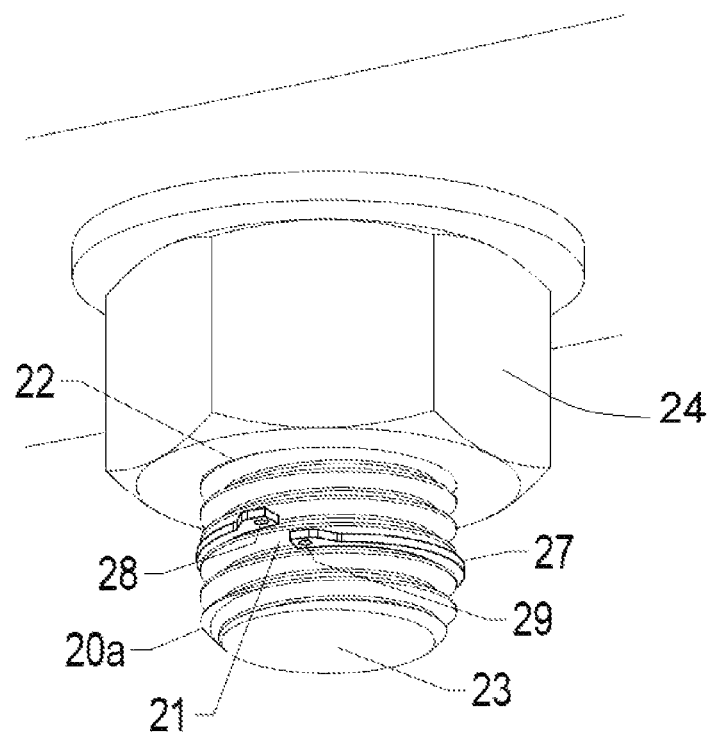

In FIG. 5c, as previously commented, the upper flange of the first tower section may be bolted together with the lower flange of the second tower section. In this example, a bolt 20a configured to join together the flanges of the tower sections is shown. The bolt 20a is configured to be screwed into a nut 24, thus the first and second flanges of the tower sections may be connected and secured to each other. The bolt 20a comprises threads 21 along its outer circumferential surface between a head portion 22 and a bottom portion 23 of the bolt.

A C-shaped snap ring 27 is provided in this example. The snap ring 27 is configured to be mounted in one of the grooves of the thread 21 of the bolt 20a. To this end, the snap ring may have certain flexibility to fit around the bolt, and snap into place.

In this example, the locking ring may comprise a first hole 28 and a second hole 29. The first hole 28 may be located at a first end of the snap ring. The second hole 29 may be located at a second end of the snap ring. When the snap ring is fitted around the bolt, the first hole and second hole may be located relatively close to each other.

Figure 5D:
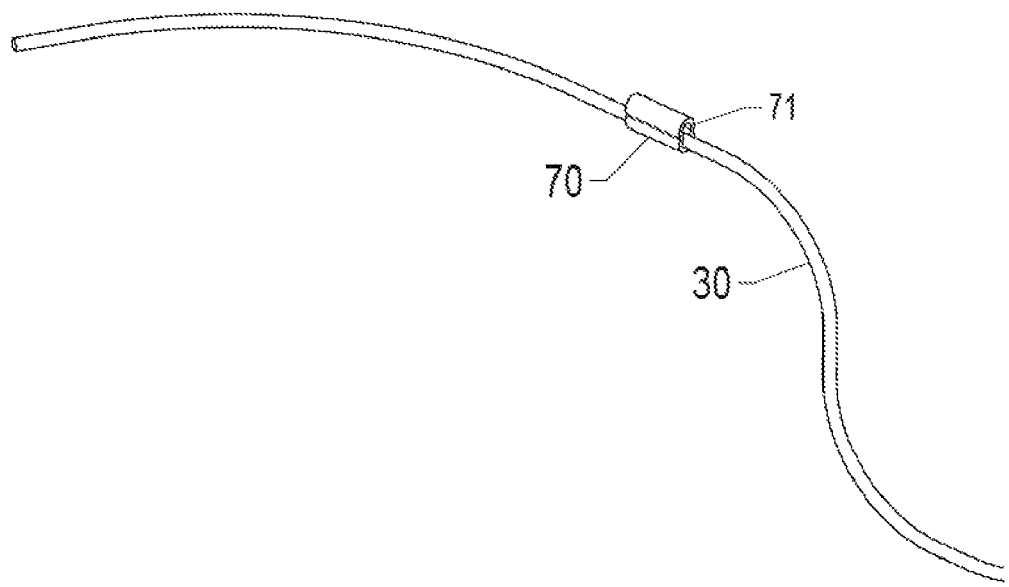

In FIG. 5d, a retention element 70 e.g. a sleeve having two passages may be provided. The retention element 70 is used to secure a looped end in a wire as will be explained below.

The retention element 70 could in some examples be pre-assembled with the anchoring element 30, thus forming a pre-assembled kit. Alternatively, the retention element 70 and the anchoring element 30 can be delivered separately as a set of parts, in which case the personnel mounting the deflector plate may insert the first end of the anchoring element 30 through a passage 71 of the retention element and slide the retention element 70 along the wire in preparation for use.

Figure 5E:
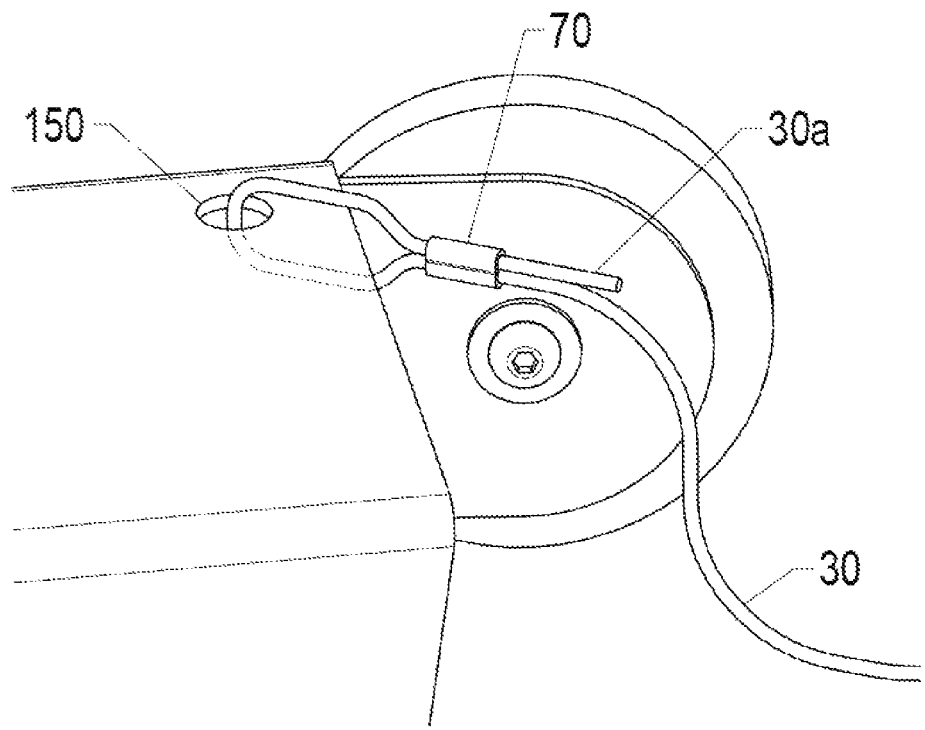

In FIG. 5e, the retention element 70 has already been properly positioned along the wire 30. The wire 30 can then be inserted through hole 150 of the deflector plate. In this figure, a first end 30a of the wire may be inserted through the hole 150 with at least a portion of the wire protruding beyond the hole. Once the first end 30a is inserted, the first end 30a may be laid upon and interconnected via the same retention element using a second passage therein. A crimping tool may be used to plastically deform the retention element and secure the loop.

Figure 5F:
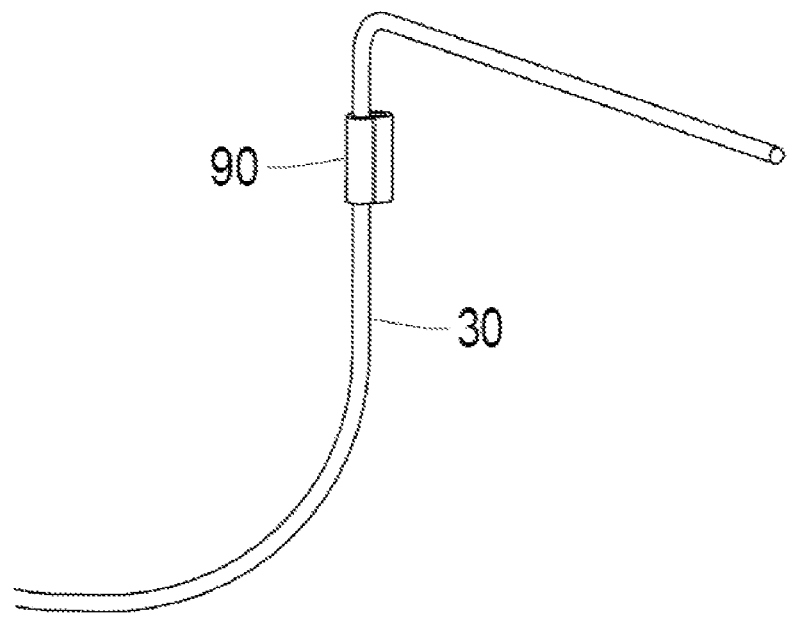

In FIG. 5f, a second retention element 90 may be provided (which may be a similar sleeve as described before). The second retention element 90 may have a suitable diameter to receive the wire 30. The remainder of the structure of the retention element 90 may be substantially the same as described in FIG. 5d.

Particularly in this figure, the retention element 90 could be pre-assembled with the anchoring element, thus forming a pre-assembled kit. Alternatively, the retention element 90 and the wire 30 can be delivered separately as a set of parts, in which case the personnel mounting the deflector plate introduces the second end of the wire 30 through a passage of the second retention element 90 and, subsequently, slides the retention element 90 along the wire in preparation for use.

Figure 5G:
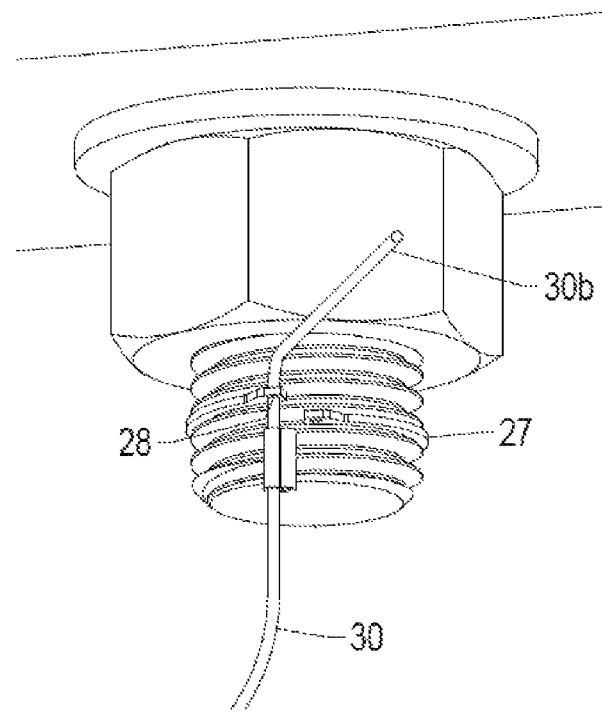

In FIG. 5g, a second end 30b of the wire 30 may be inserted through the hole 28 of the snap ring 27 with at least a portion of the wire 30 protruding beyond the hole 28.

Figure 5H:
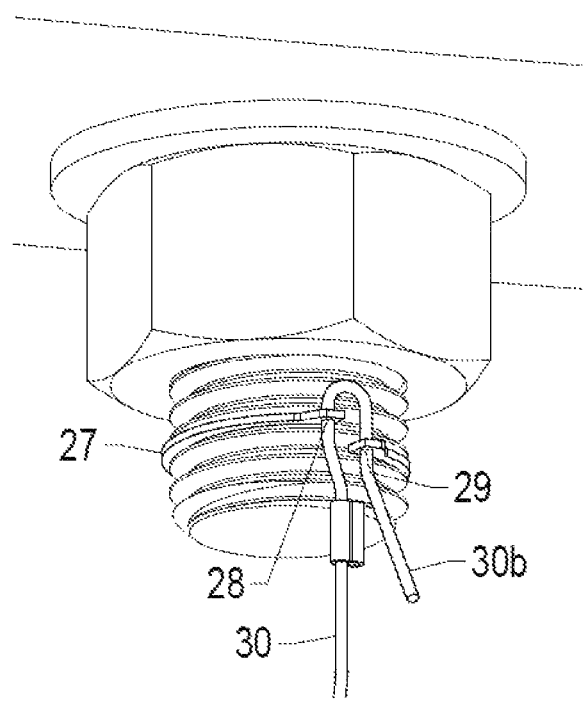

In FIG. 5h, once the second end 30b is inserted through a first hole 28, the second end 30b of the wire may be further inserted through the second hole 29 of the snap ring 27, with at least a portion of the wire 30 protruding beyond the hole 29.

Figure 5I:
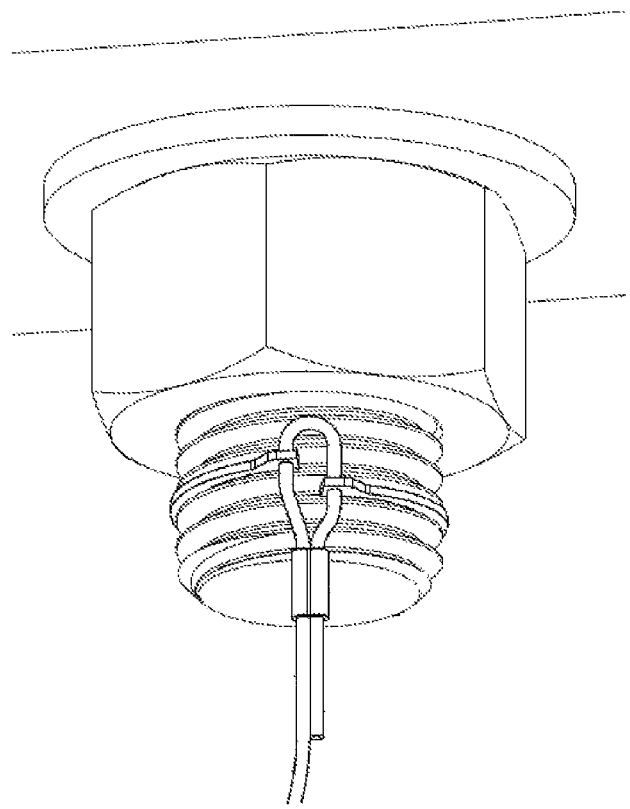

In FIG. 5i, similarly as in FIG. 5e, once a looped end may be formed using the sleeve, which may subsequently be deformed.

Although only a number of examples have been disclosed herein, other alternatives, modifications, uses and/or equivalents thereof are possible. Furthermore, all possible combinations of the described examples are also covered. Thus, the scope of the present disclosure should not be limited by particular examples, but should be determined only by a fair reading of the claims that follow.

What is claimed is:

1. A kit including:
   a deflector plate configured to avoid collisions with an interior component of a tower portion for personnel ascending or descending the tower portion, the tower portion comprising one or more tower sections, wherein
   (a) the deflector plate has a first mounting surface at a first end of the deflector plate, and a second mounting surface at a second opposite end of the deflector plate,
   (b) said deflector plate extends longitudinally from said first mounting surface to said second mounting surface so that said first mounting surface and said second mounting surface in use are attached to an inner surface of one of the tower sections and
   (c) said first mounting surface and second mounting surface comprise one or more magnets for attachment to one of the tower sections,
   and the deflector plate comprises:
   a hole configured to receive an anchoring element for securing the deflector plate to the tower portion, and
   an anchoring element for engaging with the hole of the deflector plate and mechanically securing the deflector plate to the tower section,
   wherein the anchoring element is a wire.

2. The kit according to claim 1, further comprising one or more retention elements configured to secure a loop in the wire by retaining portions of the wire.

3. The kit according to claim 2, wherein the retention elements comprise a passage configured to allow the insertion and removal of the anchoring element.

4. The kit according to claim 1, wherein the deflector plate in said kit is substantially straight.

5. The kit according to claim 1, wherein the deflector plate in said kit has a first plate section and a second plate section, the first and second plate sections defining a sharp angle between them.

6. The kit according to claim 1, wherein the second mounting surface of said deflector plate in said kit is configured for attachment to an upper or a lower connection flange of the tower section.

7. The kit according to claim 1, wherein the magnets in said deflector plate in said kit are attached to the first and/or the second mounting surface with bolts or screws.

8. The kit according to claim 1, wherein said first and second mounting surfaces of said deflector plates are each formed by flanges.

9. A method for avoiding collisions in a tower including a tower section, the method comprising:
   providing the kit according to claim 1;
   bringing the first mounting surface of the deflector plate in said kit in proximity of an inner surface of the tower section;

pushing the deflector plate towards the inner surface of the tower section such that the first mounting surface is magnetically coupled to the inner surface of the tower section;

engaging the anchoring element in said kit, with the hole of the deflector plate and mechanically securing the deflector plate to the tower.

10. The method according to claim 9, wherein pushing the deflector plate towards the inner surface further comprises magnetically coupling the second mounting surface of the deflector plate to a cylindrical inner surface of the tower section.

11. The method according to claim 9, wherein pushing the deflector plate towards the inner surface further comprises magnetically coupling the second mounting surface of the deflector plate to a connection flange of the tower section.

12. The method according to claim 9, wherein securing the wire of the kit to the tower comprises engaging a snap ring having a first hole and a second hole with a groove of an outer circumferential surface of a fastener;

inserting an end of the wire through a first and second holes of the snap ring to form an end loop; and securing the end loop.

13. A kit comprising:

a deflector plate configured to avoid collisions with an interior component of a tower portion comprising one or more tower sections for personnel ascending or descending the tower portion, wherein the deflector plate extends from a first mounting surface to a second mounting surface, and the first mounting surface and second mounting surface comprise one or more magnets for attachment to an inner surface of one of the tower sections, and the deflector plate further comprises a hole, and the kit further comprises:

a wire for engaging with the hole of the deflector plate and mechanically securing the deflector plate to the tower section, and a snap ring configured to be engaged with a groove defined in an outer circumferential surface of a fastener for mounting to a flange of a tower section, wherein the snap ring is configured to couple with the wire.

14. The kit according to claim 13, wherein the snap ring comprises a first and a second hole, such that the wire can be coupled to the locking ring by passing the wire through the first and second hole to form a loop.

15. The kit according to claim 13, wherein the groove in the outer circumferential surface of the fastener is a thread, and the snap ring is configured to be engaged with the thread.

* * * * *